Sept. 8, 1970 J. W. BREMER 3,528,066

FAULT TOLERANT SUPERCONDUCTIVE MEMORY

Filed Oct. 22, 1965 5 Sheets-Sheet 1

INVENTOR.
JOHN W. BREMER
BY Samuel E. Turner
ATTORNEY

Sept. 8, 1970 J. W. BREMER 3,528,066

FAULT TOLERANT SUPERCONDUCTIVE MEMORY

Filed Oct. 22, 1965 5 Sheets-Sheet 2

Sept. 8, 1970 J. W. BREMER 3,528,066

FAULT TOLERANT SUPERCONDUCTIVE MEMORY

Filed Oct. 22, 1965 5 Sheets-Sheet 3

Sept. 8, 1970 J. W. BREMER 3,528,066

FAULT TOLERANT SUPERCONDUCTIVE MEMORY

Filed Oct. 22, 1965 5 Sheets-Sheet 4

United States Patent Office 3,528,066
Patented Sept. 8, 1970

3,528,066
FAULT TOLERANT SUPERCONDUCTIVE MEMORY

John W. Bremer, Sunnyvale, Calif., assignor to General Electric Company, a corporation of New York Filed Oct. 22, 1965, Ser. No. 500,907
Int. Cl. H03k 3/38; G11c 11/44
U.S. Cl. 340—173.1 20 Claims

ABSTRACT OF THE DISCLOSURE

A location addressed superconductive memory wherein the drive lines are connected in series for increased selection speed, each drive line being provided with a controllable shunt path for the drive current. A feature of the J-cells type selection circuit is the provision of spare address cells having a selectably address decording to replace defective address cells or address cells associated with defective memory locations.

This invention relates to memory systems of the cryogenic or superconductive type and particularly to location addressing circuits which provide tolerance to faults in the memory structure and which provide high access speeds.

Because they may be fabricated by thin-film techniques, superconductive circuits are particularly advantageous for forming computer memories comprised of repetitive arrays of similar circuits. Because of low heat losses, superconductive circuitry can be greatly miniaturized and the packing density can be very high.

Various types of superconductive memories have now been described including the following examples pertinent to the present invention:

A location-addressed word-organized superconductive memory formed of cryotron-controlled persistent-current storage cells is shown by J. W. Bremer et al., in U.S. Pat. 3,167,748 entitled "Cryotron Memory" and assigned to the assignee of the present invention.

A content-addressed or associative memory system formed of cryotron-controlled persistent-current storage cells is shown by John W. Bremer, Dwight W. Doss and Bruce T. McKeever in Pat. No. 3,311,898 which was copending U.S. patent application Ser. No. 269,371, filed Apr. 1, 1963, entitled "Content Addressed Memory System" and assigned to the assignee of the present invention.

A random access, bit addressed superconductive memory of the continuous superconductive film (or continuous sheet) type is discussed by L. L. Burns, in an article entitled "Cryoelectric Memories" Proceedings of the IEEE, vol 52, No. 10, October 1964, pp. 1164–1176. Memories of this type provide bit addressing through two-dimensional (X and Y) coincident current selection in a manner analogous to the familiar magnetic core memory.

A bit-organized, random access memory system comprised of simplified persistent current storage cells is shown by V. L. Newhouse el al., in Pat. No. 3,359,545 which was copending U.S. patent application Ser. No. 419,430, filed Dec. 18, 1964, and assigned to the assignee of the present invention.

As exemplified by the foregoing references, the selection or addressing circuits or prior location addressed superconductive memories have taken the form of multilevel decoding trees formed of cryotron networks. The use of such selection tree circuits presents two major disadvantages.

First, the settling time of the selection tree increases rapidly with an increasing number of levels of decoding as is necessary for large capacity memories. In other words, because of resistive and inductive effects in the selection tree circuits, a finite "settling" time is required after selection signals are applied before subsequent operations can be performed. This of course represents a time delay which undesirably slows the operation of the computer system, and as mentioned above, this time delay increases rapidly with the number of decoding levels of the selection tree which, in turn, is a function of the size of the memory.

Second, the use of tree type selection circuits makes difficult the provision of fault tolerance in the memory system. This latter disadvantage is primarily the result of practical fabrication considerations as follows:

Thin film superconductive circuits are typically formed on a substrate or plate of limited size or area, substrates having an area of 3″ x 4″ being a typical "large" size. Since superconductive circuits are presently operated in a liquid helium environment, the size of the substrates is limited by the practical size of the liquid helium container. Furthermore, present fabrication techniques usually involve multilayer vacuum deposition of superconductive and insulating materials through fine-line masks which become impractically fragile and flexible in large sizes. Thus, superconductive circuit systems are of practical necessity formed on a number of plates which are then positioned in stacked relationship with appropriate plate-to-plate interconnections.

The problem of fault tolerance is one of economics. The cost of fabricating a superconductive circuit plate is high and because of the small size and high density of the circuit elements there are many opportunities for faults to develop such as opens, shorts and departures from design tolerance. In fact, present experience indicates that only one in several fabricated plates can be expected to be free of faults and that the average plate will contain some small number of faults. It is believed evident that it is desirable to provide tolerance to a small number of faults rather than requiring perfect plates with the consequent necessity of discarding a large percentage of plates with but a few faults.

The prior art selection tree arrangements are not well-adapted to fault tolerance because operation of the cryotron elements of the tree is interdependent. Furthermore, each output line of the tree uniquely corresponds to a predetermined memory drive line. Thus a single fault in either a memory drive line or in the tree circuit will render an entire plate useless.

It is an object of the present invention to provide rapid access and fault tolerance in a location-addressed superconductive memory system.

It is another object of the invention to provide a selection circuit wherein separate portions thereof may be disabled without detriment to the functioning of the other portions of the circuit.

It is a further object of the invention to provide a sensing circuit which utilizes at least a part of the accessing circuits of the memory system whereby separate sensing lines are not required.

These and other objects are achieved according to the invention by providing an accessing or selection circuit formed of a plurality of similar, series-connected parallel-line, bistable circuits of the J-cell type, each such J-cell controllably providing drive current to a respective one of the drive lines of the memory.

It is arranged that the drive lines are provided with a shunt or parallel path for the drive current and it is further arranged that the drive lines are connected in series. With this arrangement, the settling time of selection circuit is substantially no more than the settling time of the address decoding circuitry associated with a single one of the drive lines, this circuitry including a J-cell addressing circuit and its associated drive line-shunt path combination. Thus with the arrangement of the present invention, the size of the memory can be increased to any reasonable extent without substantial increase in the settling time of the selection circuit herein disclosed.

The operation of each J-cell of the selection circuit is independent of the other J-cells, that is, each J-cell contains all of the address decoding cryotrons for its respective memory location. Thus, the J-cell corresponding to a faulty memory location can be disabled, so that the faulty location is not accessable, without affecting the operation of the other J-cells.

In some memory systems it may be sufficient to simply omit a faulty memory location or as an alternative, and in accordance with one embodiment of the invention, redundant or spare memory locations are provided to replace the faulty memory locations, each space memory location having associated therewith a special addressing J-cell having selectable address decoding which can be set to the address of the faulty memory location that the spare memory location replaces.

In a bit-organized memory system it is a feature of the invention to provide a readout or sensing circuit which utilizes the drive lines in one direction of the memory array as sensing means thereby avoiding the necessity of a separate sensing line. Thus the selection circuit of the invention provides several substantial advantages including increased selection speed and fault tolerance.

The addressing or selection circuit of the invention is well-adapted for use with either a continuous film memory system or memory systems formed of discrete cells and its use in both types of systems is decribed more specifically in the following detailed description with reference to the accompanying drawing in which.

Figure 8A:
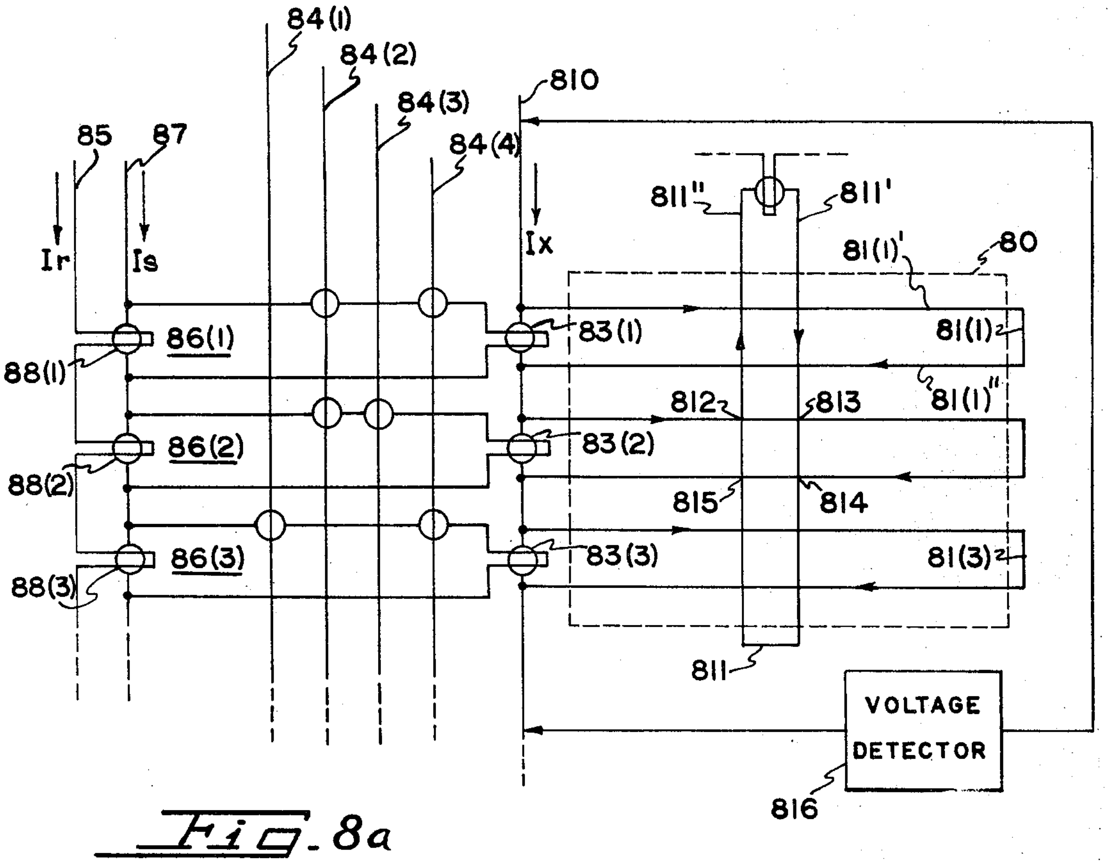
Figure 8B:
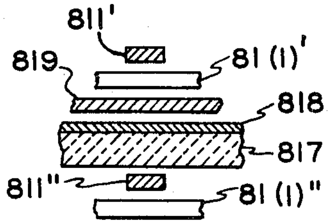
Figure 9:
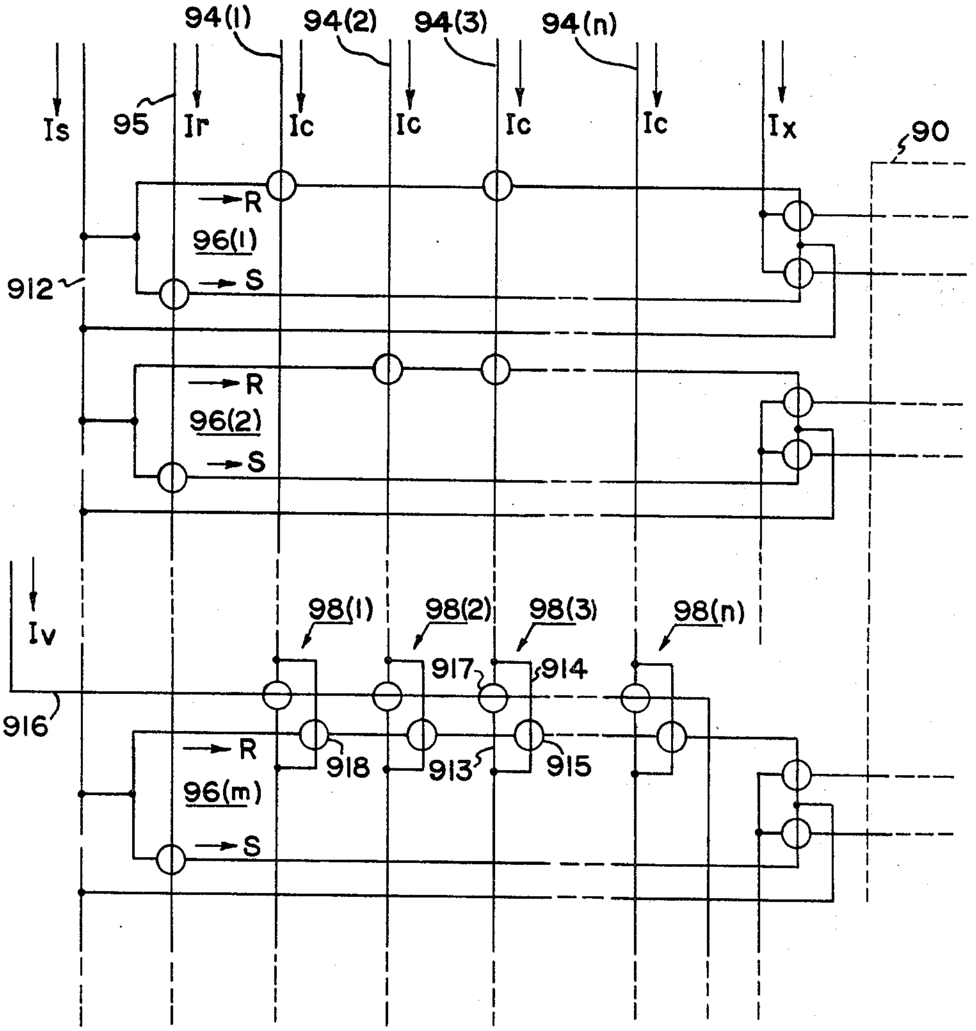

FIG. 8*a* is a schematic illustration of another embodiment of the selection circuit of the invention and also illustrating a simplified sensing arrangement;

FIG. 8*b* is a cross-section view of a memory plane adjacent a drive line crossover illustrating the superposition of the two parts of a drive line separated by a shield plane; and FIG. 9 is a schematic illustration of a selection circuit according to the invention providing variable stored address selection circuits to provide fault tolerance.

The selection circuit of the invention is formed of networks of superconductive switches or cryotrons. The operation of cryotron switches is based on the fact that certain electrical conductors exhibit a loss of electrical resistance at supercold temperatures approaching absolute zero and regain resistance in the presence of a certain "critical" magnetic field. The critical field depends upon the particular superconductive material as well as its temperature. Superconductive materials requiring comparatively high critical magnetic fields are known as "hard" superconductors while those requiring comparatively low critical magnetic fields are known as "soft" superconductors.

In the preferred thin-film form the cryotron comprises a gate conductor film of soft superconductive material which is crossed by a narrow control conductor film insulated therefrom and preferably formed of hard superconductive material. Both the gate conductor and the control conductor are thus normally in the superconducting state. If sufficient current is caused to flow through the control conductor the resulting magnetic field causes the gate conductor to become resistive in the region of the crossover.

Figure 1:
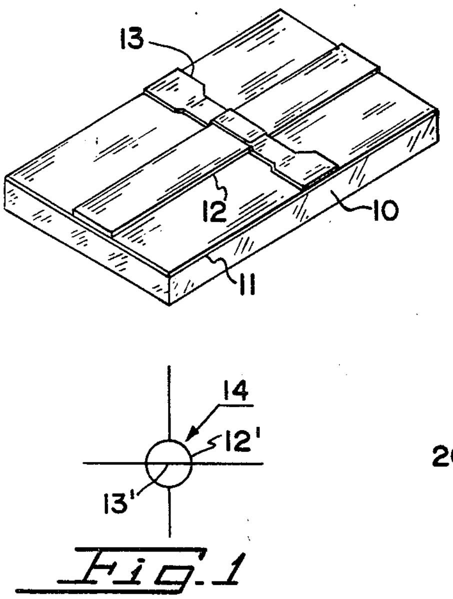
FIG. 1 is a perspective illustration of an example of the structure of a thin-film cryotron together with a schematic symbol thereof.

Shown in FIG. 1 is an example of the structure of the thin film form of a basic cryotron or superconductive switching element. Thin film cryotron circuitry is ordinarily formed on a flat base or substrate such as a substrate 10. A substrate is ordinarily formed of an insulating material having a smooth surface such as glass. In order to decrease circuit inductance it is preferable to provide a superconductive shield plane 11 underlying the cryogenic circuitry. The shield plane 11 may be formed of a thin film of hard superconductive material such as lead. A layer of insulating material such as silicon monoxide, not shown, is formed over the shield plane 11 to insulate the subsequently formed structure therefrom.

The active portions of the cryotron comprise a gate conductor 12 hereinafter referred to as a "gate" which is crossed by a control conductor 13 hereinafter referred to as a "control." The control 13 is insulated from the gate 12 by a film of insulating material such as silicon monoxide. The gate 12 is formed of soft superconductive material such as tin while the control 13 is formed of a hard superconductive material such as lead. Thus the magnetic field resulting from a sufficient current flow in the control 13 causes the gate 12 to become resistive in the region of the cross-over while the superconductivity of the hard superconductive material of the control 13 is not destroyed. Thus the cryotron comprises a two-state device, that is, the gate is superconductive in the absence of a current in the control and the gate is resistive in the presence of a current in the control which exceeds a predetermined design threshold.

Also shown in FIG. 1 is a schematic symbol 14 which is used herein to represent a cryotron. The gate is represented by a circle 12' and the control by a line 13' crossing the circle. (A more detailed discussion of cryotrons is given by John W. Bremer in "Superconductive Devices," chapter 2, McGraw-Hill Book Company, Inc., New York, 1962.)

Figure 2:
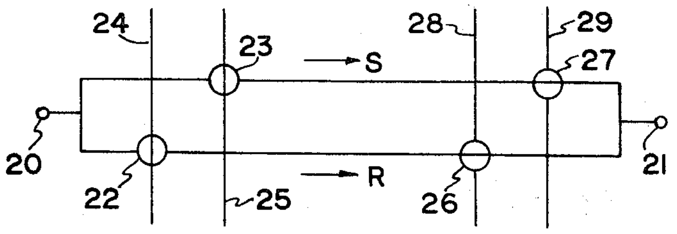
FIG. 2 is a schematic illustration of a "J-cell" circuit as employed in the system of the invention.

Schematically illustrated in FIG. 2 is a cryotron circuit called a "J-cell." While this circuit is relatively simple, a clear understanding of its operation will aid the understanding of the memory addressing system to be described hereinafter.

The J-cell is formed of parallel current paths. Cryotrons in each path can be controlled to render the path resistive. In this way a current applied to the cell can be directed through a selected one of the paths to the exclusion of current in the other paths.

It is an important characteristic of superconductive circuits that a current once established in a selected superconductive path remains in the selected path until diverted therefrom even though parallel paths are thereafter allowed to become superconductive.

The J-cell illustrated in FIG. 2 comprises a pair of parallel current paths S and R between a pair of terminals 20 and 21 to which a current is applied. If both paths S and R are superconductive the applied J-cell current divides in inverse proportion to the inductance of the two paths. However, a cryotron 22 in the path R and a cryotron 23 in the path S provide input control of the J-cell. A control current applied to an input control line 24 renders the gate of cryotron 22 resistive to thus divert the applied J-cell current to the path S. Similarly, a control current applied to a line 25 makes the gate of cryotron 23 resistive to thus divert the J-cell current to the line R. Once the J-cell current is established in the path S or R, as the case may be, it remains therein until diverted therefrom even though the input control current is removed whereby both paths S and R are superconductive.

It is thus seen that the J-cell can be used as a two-state device, one state (which may be called the set state) being evidenced by J-cell current flow in the path S and the other state (which may be called the reset state) being evidenced by J-cell current flow in the path R.

A pair of cryotrons 26 and 27 may be provided to detect the state of the J-cell. The J-cell current in path R flows through the control of the cryotron 26 thus rendering the gate thereof, and hence a line 28, resistive. Similarly, the J-cell current in path S flows through the control of cryotron 27 thus rendering a line 29 resistive.

To aid the appreciation of the advantages of the present invention the commonly used tree type selection circuit will be briefly discussed. To facilitate this discussion, a memory system using the prior art tree type selection circuits is reproduced in FIG. 3.

Figure 3:
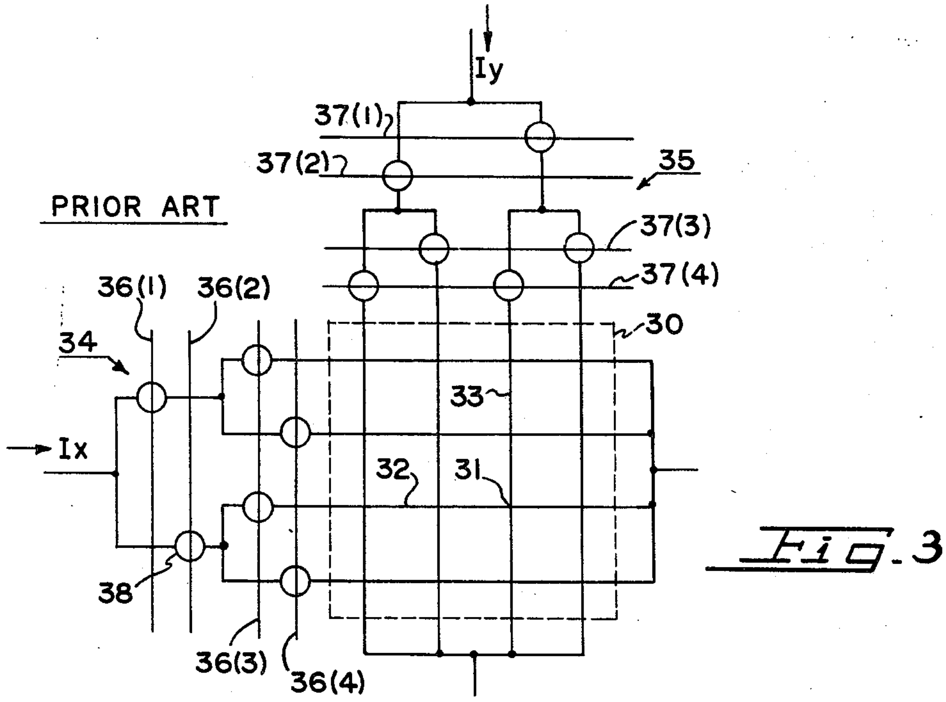
FIG. 3 is a schematic illustration of a prior art "tree" type of selection circuit.

In FIG. 3 a memory plane 30 may be, for example, the continuous superconductive film of a continuous film memory. As described more fully in the previously mentioned publication by L. L. Burns, the operation of such a memory requires the coincidence of drive currents I$x$ and I$y$. For example, a memory location 31 will be selected if the drive current I$x$ is directed through a drive line 32 and the drive current I$y$ is simultaneously directed through a drive line 33.

To provide this required directing of the drive currents, an X selection tree 34 and a Y selection tree 35 are provided. Each of these selection trees contains a number of branchs each of which can be selectively made resistive by a respective cryotron contained therein.

The X selection tree 34 includes a plurality of address decoding lines 36(1)–36(4) each of these lines containing the control of one or more of the selection tree cryotrons. Similarly, the Y selection tree includes a plurality of address decoding lines 37(1)–37(4).

Thus to select the memory location 31, selection currents are applied to decoding lines 36(1 and 36(4) of the X selection tree 34 and to the decoding lines 37(2) and 37(3) of Y selection tree 35.

Two substantial disadvantages of this prior art type of selection arrangement are to be noted: First the settling time of the selection tree increases rapidly with an increase in the number of levels of decoding as is necessary for large memories. (The settling time is defined for present purposes as the time needed for the drive currents to stabilize to the extent that the next operation can be performed.) This increase in settling time is attributable to the fact that the non-selected branches of the selection tree and the non-selected drive lines connected thereto are effectively connected in parallel to the selected branches and selected drive line. These non-selected circuits thus constitute a shunt loading of the selected circuit which delays the build-up of the drive current to the required percentage of its final value in the selected drive line. There is, therefore, a practical limit to the size of memories that can be driven with tree type selection circuits.

A second disadvantage of the prior art arrangement of FIG. 3 is that it is not well adapted to the provision of fault tolerance. For example, a fault in a cryotron 38 in the first decoding level of the X selection tree 34 would disable one-half of the memory.

Figure 4:
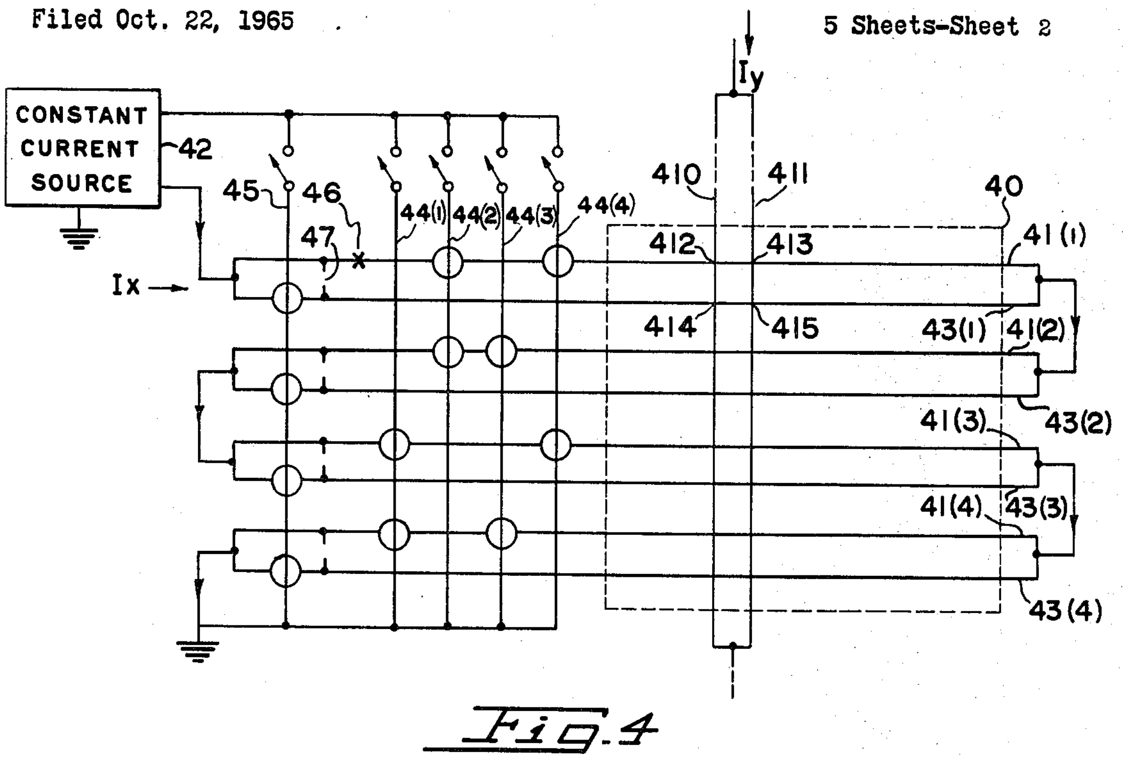
FIG. 4 is a schematic illustration of the basic form or first embodiment of the selection circuit of the invention.

The selection circuit of the invention, the basic form of which is shown in FIG. 4, avoids the above-discussed disadvantages of the prior art selection circuits. The selection circuit of the invention has two outstanding features as follows: First, the address decoding circuits and the drive lines are connected in a series arrangement so as to avoid substantial shunt loading. Thus the settling time of the selection circuit is reduced to the settling time of a single drive line and its associated address decoding circuit. The settling time is thus substantially independent of the size of the memory. Second, each of the address decoding circuits contains all of the address decoding for its associated drive line; the operation of each is independent of the others. Thus faulty address decoding circuits, memory locations or drive lines can be removed from operation without affecting operation of the remaining circuitry.

The basic form of the selection circuit of the invention as shown in FIG. 4 comprises a plurality of drive lines 41(1)–41(4) traversing a memory plane 40. The drive lines 41(1)–41(4) are connected in series with one another and in series with a constant current source 42 which provides a drive current I$x$. A plurality of shunt lines 43(1)–43(4) are provided, each of which is connected in parallel with a respective one of the drive lines 41(1)–41(4). Each of the shunt lines 43(1)–43(4) thus provides an alternate path for the drive current I$x$ and it is seen that each drive line and its parallel connected shunt line constitutes a J-cell circuit as described hereinbefore.

To the left of the memory plane 40, as shown in FIG. 4, a plurality of cryotrons having the gates thereof connected in the drive lines 41(1)–41(4) constitute an address decoding arrangement. These cryotrons are controlled by currents applied to selected ones of a plurality of address control lines 44(1)–44(4) which contain the controls of these cryotrons.

A plurality of cryotrons each having the gate thereof connected in a respective one of the shunt lines 43(1)–43(4) is controlled by current in a reset line 45 to establish the initial conditions for a selection operation.

It is noted that only the address circuitry for the X direction drive lines is illustrated in FIG. 4. For use with a cryotron memory as shown, for example, in the previously mentioned Pat. No. 3,167,748 only this one selection circuit is required. For use with a coincident current memory such as the continuous film memory, the address circuitry and the drive and shunt lines may be duplicated in the Y direction.

Operation of the selection circuit of FIG. 4 is as follows: A current is applied to the reset line 45. This renders the shunt lines 43(1)–43(4) resistive and directs the drive current I$x$ through the drive lines 41(1)–41(4).

To select the desired drive line, currents are now selectively applied to the address control lines 44(1)–44(4). For example, if it is desired to select the drive line (41)3, control currents are applied to address control lines 44(2) and 44(3). Currents through the controls of the cryotrons in lines 44(2) and 44(3) render resistive the drive lines 41(1), 41(2) and 41(4) while the selected drive line 41(3) remains superconductive. The drive current $Ix$ is therefore diverted into the shunt lines 43(1), 43(2) and 43(4) but it remains in the one selected drive line 41(3).

To further illustrate the use of the selection circuit of the invention in a two-dimensional or coincidental current system, a single Y direction drive line 410 with a parallel connected shunt line 411 is shown in FIG. 4, it being understood that lines 410 and 411 are parts of a complete Y drive line and selection system not shown. In the prior art continuous film memory, as illustrated in FIG. 3, each crossover of the drive lines provides a bit storage location. However, in the configuration illustrated in FIG. 4, because each drive line is paralleled by a shunt line, there are four crossovers for each bit storage location. For example the following crossovers provide one bit storage location: A crossover 412 of drive lines 41(1) and 410, a crossover 413 of drive line 41(1) and shunt line 411, a crossover 414 of drive line 410 and shunt line 43(1), and a crossover 415 of shunt lines 43(1) and 411.

The drive lines crossovers, such as the crossover 412, are the crossovers of interest and the other crossovers usually may be ignored. For example, where a sense line of the zig-zag type is used, as mentioned in the previously mentioned article by Burns, the sense line may be passed adjacent only the drive line crossovers.

For some applications it may be desirable to render inactive all of the crossovers except the drive line crossovers. This may be accomplished in several ways. For example, the current density in the lines may be lowered in the region of the crossover by widening or thickening the lines in this region. Alternatively, the lines may be shelded from one another in the region of the crossover by an intervening superconductive film.

Where the drive lines and shunt lines are fabricated in the same layer or plane, as illustrated in FIG. 4, there is apparently a necessary decrease in the bit packing density of the memory plane 40. That is, as compared to the prior art arrangement of FIG. 3, the arrangement of FIG. 4 results in fewer bit storage locations per unit area of the storage plane. This apparent disadvantage of the arrangement of FIG. 4, is often more theoretical than real because the storage density on a substrate, in terms of the number of drive lines per linear measure, is often determined by the space required for the address selection circuitry and not by the drive line spacing.

Figures 5, 6:
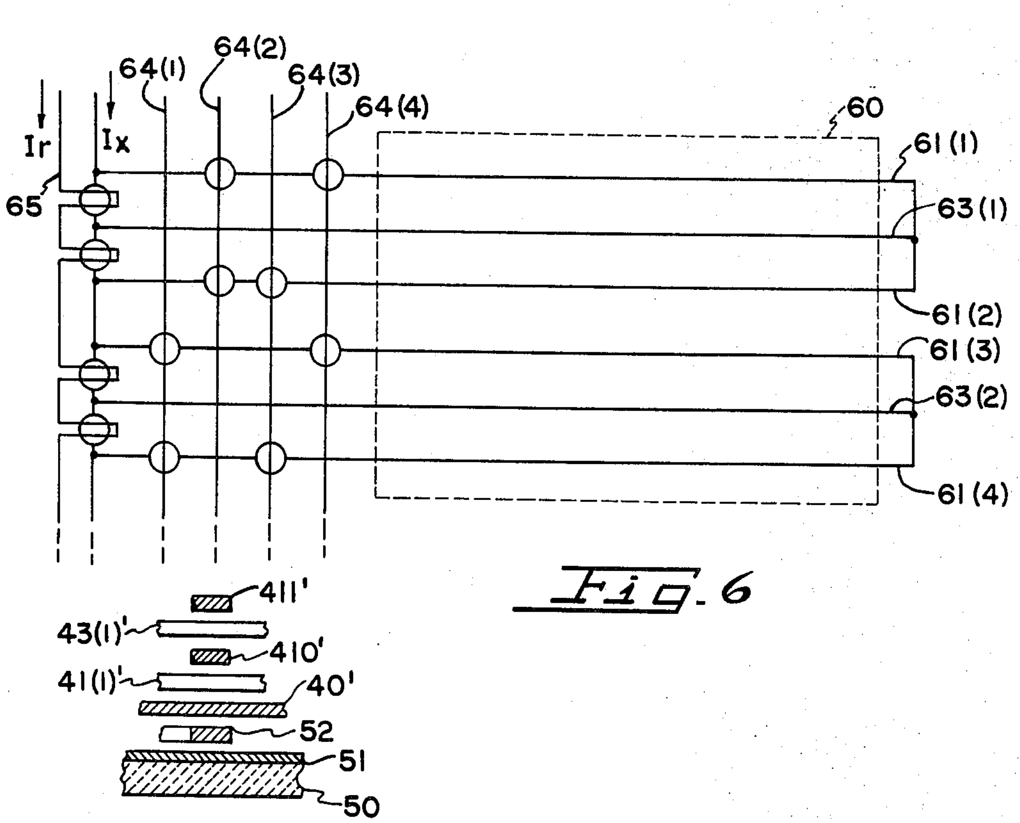
FIG. 5 is a cross-section view of a memory plane adjacent a drive line crossover illustrating the superposition of the drive and shunt lines.
FIG. 6 is a schematic illustration of a modified form of the selection circuit of FIG. 4 wherein fewer lines traversing the memory are required.

However, where it is desired to more closely space the drive lines, the drive and shunt lines may be superpositioned in different layers. This construction of a continuous film memory plane is illustrated in FIG. 5 which is a cross-sectional elevation view of a portion of such a memory plane adjacent a crossover. The various conductive layers formed on a substrate 50 are as follows: A first layer comprises a superconductive shield plane 51; a second layer includes a sensing plane or sensing lines such as a sensing line 52; a third layer comprises a thin-film superconductive memory plane 40′; a fourth layer includes the X drive lines such as a drive line 41(1)′; a fifth layer includes the Y drive lines such as a drive line 410′; a sixth layer includes the shunt lines for the X drive lines such as a shunt line 43(1)′ superimposed above the drive line 41(1)′; and a seventh layer includes the shunt lines for the Y drive lines such as a shunt line 411′ superimposed above the drive line 410′. These layers are insulated from one another by films of a material such as silicon monoxide, not shown.

Thus it is seen in FIG. 4 that each drive line and its parallel connected shunt line constitutes a two-line J-cell. These J-cells are connected in series for the drive current and, therefore, all J-cells effectively simultaneously receive the drive current. Thus the operation or settling time of the selection system is substantially equal to the settling time of a single J-cell.

Each J-cell contains all of the address decoding cryotrons for its drive line. Therefore, the operation of each J-cell is independent of the others. This fact provides fault tolerance in that a faulty J-cell or a J-cell associated with a faulty memory location may be disabled to eliminate the faulty portion from attempted utilization without affecting the operation of the remaining J-cells of the selection system. For example, referring again to FIG. 4, if there is a fault associated with the J-cell comprised of drive line 41(1) and shunt line 43(1), this J-cell may be disabled by opening the drive line 41(1) at a point 46 and bridging a gap 47 to provide a shunt path for the drive current around the reset cryotron in the shunt line 43(1).

The number of drive lines traversing the memory plane may be reduced by arranging that each two of the drive lines share a single shunt line. Such an arrangement, according to the invention, is illustrated in FIG. 6.

A plurality of drive lines 61(1)–61(4) traverse a memory plane 60. The drive lines 61(1) and 61(2) share a shunt line 63(1) while the drive lines 61(3) and 61(4) similarly share a shunt line 63(2). Control current selectively applied to a plurality of control lines 64(1)–64(4) provide selection of the desired one of the drive lines.

To condition the circuit for selection, a reset current I*r* is applied to a reset line 65. The current I*r* renders resistive a plurality of reset cryotrons whereby the drive current I*x* is directed through all of the drive lines. The reset current I*r* is then removed. If it is desired to select, for example, the drive line 61(1), control currents are applied to control lines 64(1) and 64(3). The control lines contain the controls of cryotrons in the drive lines 61(2), 61(3) and 61(4) whereby these drive lines thus become resistive. Under these conditions the drive current I*x* flows to the right through drive line 61(1), it returns to the left through the shunt line 63(1), and thence downward through the now superconductive gates of the reset cryotrons.

In the circuits of FIGS. 4 and 6 the drive current is directed through all of the drive lines during the reset operation. For some applications this may be undesirable. Thus, in accordance with another aspect of the invention, the selection and drive operations may be separated and a circuit for accomplishing such separation is shown in FIG. 7.

Figure 7:
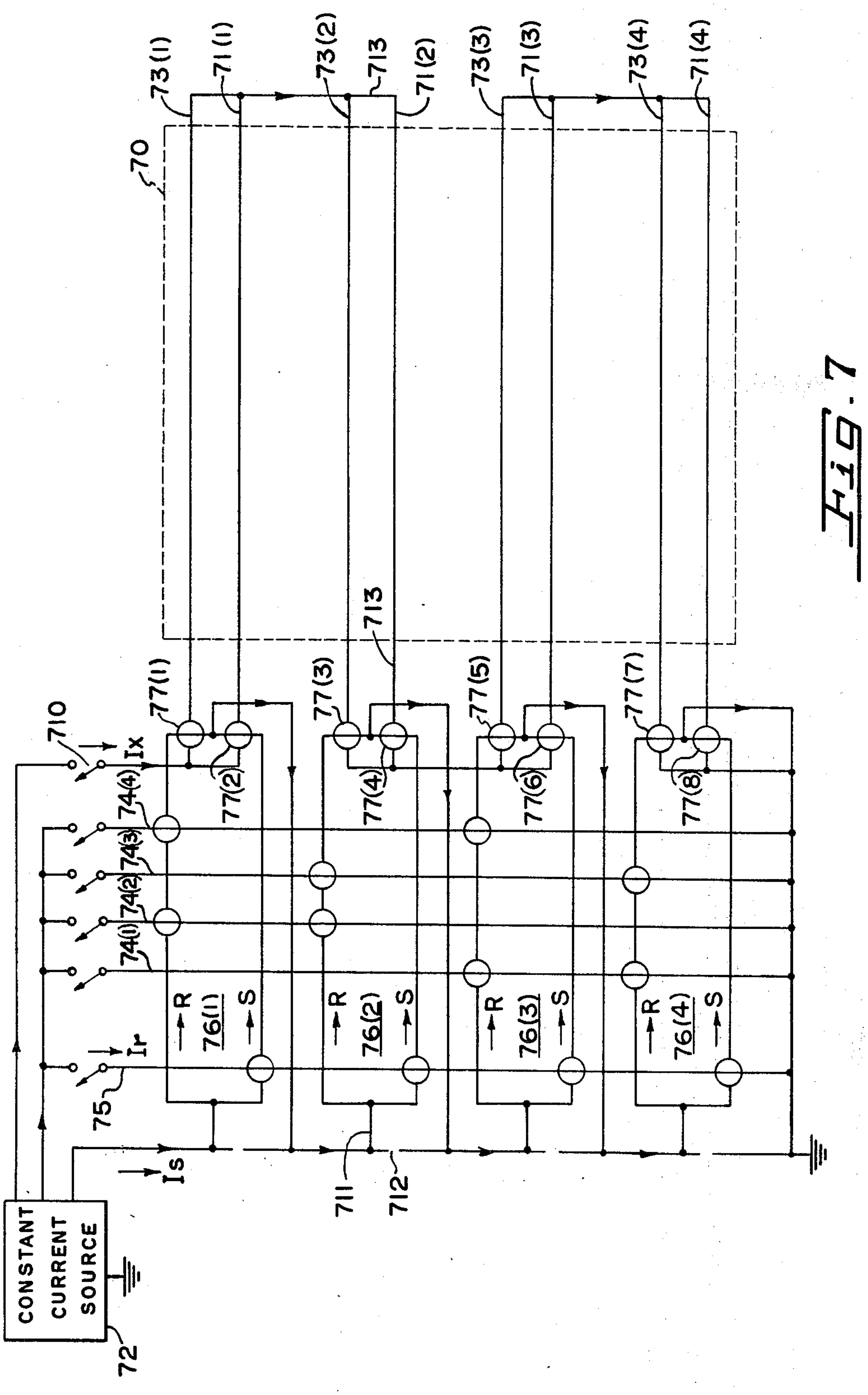
FIG. 7 is a schematic illustration of a second embodiment of the invention using separate selection and drive currents.

In FIG. 7, a plurality of drive lines 71(1)–71(4) and a plurality of shunt lines 73(1)–73(4) traverse a memory plane 70. A drive current I*x* is selectively applied from a source 72 through a switch 710. The address selection circuit of the embodiment of FIG. 7 includes a plurality of two-line J-cells 76(1)–76(4) each having a set path S and a reset path R. These J-cells are connected in series for a selection current I*s* received from the source 72. A plurality of cryotrons in the reset paths of the J-cells are controlled by currents selectively applied to a plurality of address control lines 74(1)–74(4) for selection of the desired drive line.

Assuming for example, that it is desired to select the drive line 71(2), the operation of the circuit of FIG. 7 is as follows: A current I*r* is applied to a reset line 75. This line contains the controls of a plurality of cryotrons, one in each of the set paths of the J-cells. Thus the set paths of J-cells 76(1)–76(4) are rendered resistive and the selection current I*s* is, therefore, directed through the reset paths of the J-cells. After the selection current I*s* has been thus established in the reset paths of the J-cells, the reset current I*r* is removed.

Address control currents are now applied to address control lines 74(1) and 74(4). These lines contain the controls of address control cryotrons which render resistive the reset paths of J-cells 76(1), 76(3) and 76(4). The selection current I*s* is, therefore, directed through the set paths of these J-cells. However, the selection current I*s* remains in the reset path of J-cell 76(2).

Each of the J-cells 76(1)–76(4) includes a respective pair of a plurality of output cryotrons 77(1)–77(8). The selection current I*s* in the reset path of J-cell 76(2) flows through the control of the cryotron 77(3), the gate of which is in the shunt line 73(2). The shunt line 73(2) is thereby rendered resistive. Since there is no current in the set path of the J-cell 76(2), the cryotron 77(4) and hence the drive line 71(2) remain superconductive.

The switch 710 may now be closed to apply the drive current I*x*. The cryotron 77(1) is superconductive and the cryotron 77(2) is resistive because of the current I*s* in the set side of J-cell 76(1). The drive current I*x*, therefore, is directed through the shunt line 73(1), through the drive line 71(2), and thence through the shunt lines 73(3) and 73(4). Thus, the drive current I*x* is directed through the one selected drive line and through the shunt lines in parallel with all of the unselected drive lines.

Provision for fault tolerance in the circuit of FIG. 7 is similar to that described hereinbefore in connection with FIG. 4. For example, if it is desired to disable the selection of drive line 71(2), the circuit to selection J-cell 76(2) may be opened at point 711 and a gap 712 may be bridged. In this manner the J-cell 76(2) is bypassed for the selection current I*s*. It may also be desirable to open the drive line 71(2) at a point 713, for example, to assure that the drive current $I_x$ does not flow therethrough.

It is noted that the drive and shunt lines of the circuit of FIG. 7 may be superpositioned in the manner illustrated in FIG. 5. It is also noted that the circuit of FIG. 7 can be altered so that each two of the drive lines share a single shunt line. For example, the shunt line 73(1) could be eliminated by connecting a vertical line between the right hand sides of the gates of cryotrons 77(1) and 77(3).

Another embodiment of the selection circuit of the invention is illustrated in FIG. 8*a*. When a current is applied to parallel super-conductive paths the current divides in inverse proportion to the inductance of the paths. Advantage is taken of this principle in the embodiment of FIG. 8*a* to minimize the number of cryotrons required. This embodiment also provides separation of the selection and drive operations.

In FIG. 8*a* a memory plane 80 is traversed by a plurality of drive lines 81(1)–81(3) each of which forms a loop across the memory plane. Each drive line is shunted by the gate of a respective one of a plurality of cryotrons 83(1)–83(3). Thus in this embodiment the shunt path for the drive current does not traverse the memory plane. Instead, the shunt path comprises essentially only the gate of a cryotron. Because the inductance of the gate of a cryotron can be made much less than the inductance of the loop comprising a drive line, if both the gate of the cryotron and the drive line are superconductive the substantial portion of the applied drive current flows through the shunt gate. For example, if both the gate of cryotron 83(1) and the drive line 81(1) are superconductive when the drive current $I_x$ is applied to a line 810, the substantial portion of the current $I_x$ flows through the gate of cryotron 83(1) and the line 81(1) remains essentially undriven.

The selection circuit of FIG. 8*a* comprises a plurality of J-cells 86(1)–86(3), which are connected in series for a selection current $I_s$ applied to a line 87. Each of these J-cells controls a respective one of the shunt cryotrons 83(1)–83(3). Address selection cryotrons in these J-cells are controlled by control currents selectively applied to a plurality of control lines 84(1)–84(4).

Assuming by way of example that it is desired to select the drive line 81(3), the operation of the circuit of FIG. 8*a* is as follows: The selection current $I_s$ is continually applied to the line 87. A reset current $I_r$ is temporarily applied to a reset line 85 which contains the controls of a plurality of reset cryotrons 88(1)–88(3). The gates of these cryotrons therefore become resistive thereby directing the selection current through the gates of the address selection cryotrons of the J-cells and through the controls of shunt cryotrons 83(1)–83(3).

The reset current $I_r$ is then removed and, for selection of drive line 81(3), control currents are applied to control lines 84(2) and 84(3). After the selection circuit has settled, the path of the selection current $I_s$ is as follows: down line 87, through the gates of cryotrons 86(1) and 86(2), through the gates of the address selection cryotrons of J-cell 86(3), and through the control of shunt cryotron 83(3). The gate of cryotron 83(3) is therefore resistive while the gates of cryotrons 83(1) and 83(2) are superconductive. Thus when the drive current $I_x$ is now applied to line 810, the current $I_x$ flows through the gates of cryotrons 83(1) and 83(2), thereby bypassing the drive lines 81(1) and 81(2) but is directed through the one selected drive line 81(3) by the resistive state of the gate of cryotron 83(3).

In the circuit of FIG. 8*a* the drive current traverses the memory plane only in the selected driveline. Thus when the circuit of FIG. 8*a* is used to drive a continuous film memory all of the drive line crossovers may be active crossovers. To illustrate this feature a single Y direction drive line 811 is illustrated in FIG. 8*a*. As can be seen, there are four crossovers for each junction of an X and a Y drive line. For example, the junction of drive lines 81(2) and 811 provides crossovers 812, 813, 814 and 815. If these crossovers are active, the same bit of information is stored at each of the four crossovers. For some applications this may provide a desirable increase in the level of the read signal. For example, if the well-known zig-zag sense line is used, it may be passed adjacent each of the crossovers.

Also illustrated in FIG. 8*a* is a simplified sensing arrangement which overcomes the problems of the zig-zag sense line and which may be used with the selection circuit of the invention for readout from any memory system which produces a voltage on the drive lines during a read operation. The sensing arrangement of the invention is illustrated in FIG. 8*a* as a suitable voltage detector 816 connected across the series connected drive lines 81(1)–81(3) to thereby sense the voltages produced thereon. This sensing arrangement may, of course, be used with other embodiments of the invention disclosed herein.

It is noted that in the circuit of FIG. 8*a* the drive current $I_x$ flows in opposite directions in the two halves of each drive line such as in the two halves 81(1)′ and 81(1)″ of drive line 81(1). Thus ordinarily these two halves may not be simply superpositioned in the manner illustrated in FIG. 5 because the magnetic fields due to the oppositely directed currents would then tend to cancel. However, superpositioning of the two halves of each drive line may be accomplished by imposing a superconductive shield between the two halves either by the use of a separate shield plane for this purpose or by forming corresponding halves of the drive line on opposite sides of the substrate. The latter arrangement is illustrated in FIG. 8*b*, which is a cross-section view of a continuous film memory taken at a crossover of superpositioned drive lines wherein lines 81(1)′ and 81(1)″ are the two halves of drive line 81(1) of FIG. 8*a* and lines 811′ and 811″ are the two halves of drive line 811.

As illustrated in FIG. 8*b*, lines 81(1)″ and 811″ are formed on one side of a substrate 817 on the other side of which is formed a first superconductive layer comprising a shield plane 818. The next layer comprises a superconductive continuous memory film 819 and the lines 81(1)′ and 811′ are formed above this memory film. In this manner the two halves of each drive line are separated by the shield plane 818 so that the magnetic fields due to the oppositely directed currents in the two halves of the drive lines do not interfere with proper operation of the memory. (The necessary layers of insulating material between conductive layers are not shown in FIG. 8*b*.)

In connection with the circuits of FIGS. 4 and 7 means have been described for disabling faulty selection J-cells or J-cells that are associated with faulty memory locations or drive lines. For some applications it may be sufficient to simply avoid use of the address corresponding to the disabled selection J-cell. However, for other applications this may create undesirable difficulties in programming or the like. It is therefore desirable to provide replacement address selection J-cells and memory locations and this is a further feature of the present invention as illustrated in FIG. 9. Broadly speaking, the essence of this feature of the invention is the provision of additional or spare selection J-cells with associated drive lines and memory locations, the address decoding of each of these spare selection J-cells being selectively variable. In other words, the address decoding of each of the spare selection J-cells can be readily altered to correspond to the fixed address of the disabled J-cell which the spare J-cell is to replace. In FIG. 9 only one spare selection J-cell is illustrated; however, the actual number of spares to be provided in a given system will be determined statistically based on the anticipated number of fixed address selection J-cells that will require disablement.

In FIG. 9 a memory plane 90 and the drive and shunt lines traversing the memory plane are incompletely shown to the right in the figure. The memory plane may comprise a continuous film memory arrangement or an array of cryotron memory cells as shown in the previously mentioned Pat. No. 3,167,748 or patent application S.N. 419,430. Also, the particular arrangement of drive and shunt lines may be selected from those described hereinbefore.

Th fixed-plus variable addressed selection circuit of the invention is illustrated in FIG. 9 as a pair of fixed address selection J-cells 96(1) and 96(2) and a variable address or spare selection J-cell 96(*m*). Operation of the J-cells 96(1) and 96(2) is similar to the selection J-cells illustrated in FIG. 7 and described hereinbefore.

To provide selectively variable addressing the spare J-cell 96(*m*) is fabricated with a persistent current address storage loop in each of a plurality of address control lines 94(1)–94(*n*); in other words, at the position of each possible address decoding cryotron. These storage loops are illustrated in FIG. 9 as a plurality of loops 98(1)–98(*n*).

The storage of persistent currents in the address storage loops of the spare J-cell 96(*m*) will be described with specific reference to storage loop 98(3) by way of example.

The storage loop 98(3) comprises a pair of branches 913 and 914. It is arranged that these branches have equal inductance whereby a control current Ic applied to the control line 94(3) divides equally through the two branches 913 and 914. In other words a current of Ic/2 flows in each branch 913 and 914.

The branches of the storage loops, such as the branch 914, contain the controls of the address cryotrons, such as a cryotron 915, in the reset path R of the spare J-cell 96(*m*). A persistent current which will add to the applied control current Ic/2 in the branch 914 may be stored as follows: The control current Ic is applied to line 94(3) and a store address current Iv is applied to a line 916. The line 916 contains the control of a cryotron 917 in the branch 913 of the storage loop 98(3). The branch 913 is therefore resistive whereby all of the control current Ic is directed through the branch 914. The current Iv is removed followed by removal of the current Ic. This results in the storage of a clockwise persistent current of magnitude Ic/2 in the storage loop 98(3). (For further details of the operation of persistent current storage cells reference is made to Chapter 4 of the previously mentioned publication "Superconductive Devices.") This clockwise persistent current in the storage loop 98(3) comprises an upward current of magnitude Ic/2 in branch 913 and a downward current of magnitude Ic/2 in branch 914.

Thus when a control current is now applied to line 94(3) during a normal selection operation, it again divides equally through the two branches 913 and 914 whereby the half of the applied current flowing in branch 914 adds to the persistent stored current therein to provide a current of magnitude equal to the full current Ic through the control of cryotron 915 in the branch 914. In this manner the reset path R of the J-cell 96(*m*) is rendered resistive to direct the selection current Is in the J-cell from the reset path R to the set path S.

It is to be noted that the address cryotrons in the reset path R of the J-cell 96(*m*), such as the cryotron 915, must have a threshold greater than the magnitude of the stored persistent current (Ic/2) in order to prevent resistance in the reset path R in the absence of applied control currents Ic.

Operation of the variable address feature will be further described by way of example on the assumption that it is desired to disable the selection J-cell 96(1) and to replace it with the spare J-cell 96(*m*), it being understood that the selection J-cells are connected in series for a selection current Is which is continually applied.

To disable the selection J-cell 96(1) a gap 912 is bridged by which the selection current Is bypasses the J-cell 96(1). Since the J-cell 96(1) contains address decoding cryotrons at the positions of address control lines 94(1) and 94(3) the corresponding address storage loops 98(1) and 98(3) of variable address J-cell 96(*m*) are to be activated.

Address storage loops 98(1) and 98(3) are activated as follows: Control currents are applied to control lines 94(1) and 94(3), and the store address current Iv is applied to line 916. The applied control currents are thereby directed through the right-hand branches of the storage loops 98(1) and 98(3). The store address current Iv is removed followed by removal of the control currents from lines 94(1) and 94(3). This action results in the storage of clockwise persistent currents of magnitude Ic/2 in the storage loops 98(1) and 98(3). (Note that no currents are stored in the storage loops 98(2) and 98(*n*).)

When control currents are now applied to control lines 94(1) and 94(3) during a normal selection operation these control currents will divide equally in the two branches of the storage loops 98(1) and 98(3). Thus the applied control currents of magnitude Ic/2 in the right-hand branches of storage loops 98(1) and 98(3) add to the stored persistent currents by which the thresholds of the cryotron 915 and a cryotron 918 are exceeded. The reset path R of J-cell 96(*m*) is therefore rendered resistive whereby the selection current Is is directed through the set path S of the J-cell in the same manner as would have obtained in the replaced J-cell 96(1).

Thus what has been described is a selection circuit for a superconductive memory system providing rapid access independent of memory size, simplified sensing and fault tolerance including selectively variable spare addressing circuits.

While the principles of the invention have been made clear in the illustrative embodiments, there will be obvious to those skilled in the art, many modifications in structure, arrangement, proportions, the elements, materials and components used in the practice of the invention, and otherwise, which are adapted for specific environments and operating requirements, without departing from these principles. The appended claims are therefore intended to cover and embrace any such modifications within the limits only of the true spirit and scope of the invention.

What is claimed is:

1. In a cryogenic memory having a plurality of superconductive drive lines for selecting memory locations, a selection circuit for passing a drive current through a selected one of said drive lines, comprising: means connecting said drive lines in series with a source of drive current; a normally superconductive shunt line connected in parallel with each of said drive lines; means for simultaneously rendering resistive said shunt lines; selectively operable address decoding means for rendering resistive all of said drive lines except the selected drive line; and means for selectively by-passing a faulty drive line of said series drive line circuit.

2. In a cryogenic memory system having a plurality of superconductive drive lines for selecting memory locations, a selection circuit for passing a drive current through a selected one of said drive lines, comprising: a respective address decoding line connected in series with each of said drive lines; means connecting the series connected decoding and drive lines in series with one another and in series with a source of drive current; a respective normally superconductive decoding shunt line connected in parallel with each said decoding line; a respective normally superconductive drive shunt line connected in parallel with each of said drive lines; means for rendering resistive said decoding shunt lines; selectively operable decoding means for rendering resistive all of said decoding lines except the decoding line connected to the selected drive line; means responsive to drive current in a decoding line for directing said drive current through the drive line connected thereto, and means for selectively by-passing a faulty drive line of said drive line series circuit.

3. In a cryogenic memory system having a plurality of drive lines for selecting memory locations, a selection circuit for passing a drive current through a selected one of said drive lines, comprising: a plurality of normally superconductive address decoding lines, each corresponding respectively to one of said drive lines; means connecting said decoding lines in series with a source of decoding current; a respective normally superconductive decoding shunt line connected in parallel with each said decoding line; means connecting said drive lines in series with a source of drive current; a respective normally superconductive drive shunt line connected in parallel with each said drive line; means for momentarily rendering resistive said decoding shunt lines whereby said decoding current is directed through said decoding lines; selectively operable decoding means for diverting said decoding current from all of said decording lines except the decoding line corresponding to said selected one of said drive lines; means responsive to the flow of decoding current in a decoding line for directing said drive current through the corresponding one of said drive lines, and means for selectively by-passing a faulty drive line of said drive line series circuit.

4. In a cryogenic memory system having a plurality of drive lines for selecting memory locations, a selection circuit for passing a drive current through a selected one of said drive lines, comprising: a plurality of drive lines each forming a loop traversing respective predetermined ones of said memory locations; means connecting said drive lines in series; a plurality of cryotrons, one for each of said drive lines, the gate of each of said cryotrons being connected in parallel with a respective one of said drive lines; a plurality of two-branch J-cells, one of the branches of each of said J-cells containing the control of a respective one of said cryotrons; means for applying a selection current to said J-cells in series; means for directing said selection current through the controls of said cryotrons, said J-cells including selectively operable address decoding means for subsequently diverting said selection current from the controls of all of said cryotrons except the cryotron connected in parallel with said selected one of said drive lines; means for applying a drive current to said series connected drive lines, and means for selectively by-passing a faulty J-cell of said series J-cells.

5. In a cryogenic memory system having a plurality of drive lines for selecting memory locations, a selection circuit for passing a drive current through a selected one of said drive lines, comprising: means connecting said drive lines in series; a plurality of pairs of cryotrons, each pair of cryotrons having gates connected in series and joining the beginning of one drive line and the end of the adjacent drive line of adjacent pairs of said drive lines; a respective shunt line connected from the junction of each said pair of cryotrons to the junction of the corresponding pair of said drive lines; means for applying a drive current to said series connected drive lines means for momentarily rendering said cryotrons resistive whereby said drive current is directed through said drive lines selectively operable decoding means in each of said drive lines for rendering all of said drive lines resistive except the selected one of said drive lines, and means for selectively by-passing a faulty drive line of said drive line series circuit.

6. In a cryogenic memory system having a plurality of drive lines for selecting memory locations, a selection circuit for passing a drive current through a selected one of said drive lines, comprising: a plurality of drive lines each forming a loop traversing respective predetermined ones of said memory locations; means connecting said drive lines in series; a plurality of cryotrons, one for each of said drive lines, the gate of each of said cryotrons being connected in parallel with a respective one of said drive lines; a plurality of two-branch J-cells one of the branches of each of said J-cells containing the control of a respective one of said cryotrons; means for applying a selection current to said J-cells in series, said J-cells including selectively operable means for directing said selection current through the control of the one of said cryotrons connected in parallel with said selected one of said drive lines, and means for selectively by-passing a faulty drive line of said drive line series circuit.

7. In a cryogenic memory having a plurality of memory locations, the combination of: a plurality of drive lines, each traversing predetermined memory locations; means connecting said drive lines in series with one another; means for applying a drive current to said series connected drive lines; a respective shunt line connected in parallel with each of said drive lines to provide alternate paths for said drive current; means for selectively by-passing said drive current around a faulty drive line of said drive line series circuit; and selectively operable means for directing said drive current through a selected one of said drive lines and through the alternate paths of the other of said drive lines.

8. The combination defined by claim 7 further including a voltage detector connected across preselected ones of said series connected drive lines.

9. In a memory system having a plurality of superconductive drive lines for selecting memory locations, a circuit for passing a drive current through a selected one of said drive lines, comprising: means connecting said drive lines in series for a drive current; a respective normally superconductive shunt path for said drive current connected in parallel with each of said drive lines, said drive lines having substantially greater inductance than said shunt paths; selectively operable means for rendering resistive only the shunt path connected in parallel with said selected drive line, and means for selectively by-passing a faulty drive line of said drive line series circuit.

10. The circuit defined by claim 9 further including a voltage detector connected across said series connected drive lines.

11. In a cryogenic memory having a plurality of memory locations, the combination of: a plurality of drive lines, each traversing predetermined memory locations; means connecting said drive lines in series; means for applying a drive current to said series connected drive lines; a respective normally superconductive shunt path for said drive current connected in parallel with each of said drive lines; a respective address circuit for each of said drive lines for controlling the path of said drive current, each of said address circuits containing selectively operable address decoding means each uniquely corresponding to the respective drive line; means for applying an address representation corresponding to a selected drive line to said address decoding means, said address circuits being responsive to said address representation for directing said drive current through said selected drive line and through the shunt paths connected in parallel with the remaining drive lines, and means for selectively by-passing a faulty drive line of said drive line series circuit.

12. The combination defined by claim 11 wherein at least one of said address circuits contains selectively variable address decoding means.

13. In a cryogenic memory having a plurality of memory addressing lines, a selection circuit for addressing a selected addressing line, comprising: a respective address decoding circuit for each of said addressing lines, a plurality of said address decoding circuits contained fixed address decoding means, at least one of said addressing decoding circuits containing selectively settable address decoding means, and means for by-passing one of said fixed addressed decoding means and substituting said settable address decoding means therefor.

14. In a cryogenic memory having a plurality of memory addressing lines, a selection circuit for addressing a selected addressing line, comprising: a respective address decoding circuit for each of said addressing lines, a plurality of said address decoding circuits containing fixed address decoding means, and at least one of said addressing decoding circuits containing selectively settable address decoding means; means for disabling any one of said plurality of address decoding circuits; and means for setting said selectively settable address decoding means of said one of said address decoding circuits to the address code contained in said disabled decoding circuit.

15. In a cryogenic memory having a plurality of memory addressing lines, a selection circuit for addressing a selected addressing line, comprising: a respective addressing circuit for each of said addressing lines, each said addressing circuit including first and second parallel connected normally superconductive lines; means for applying a selection current to said addressing circuits; means responsive to said selection current in said first line of each said addressing circuit for addressing the respectively corresponding addressing line; a plurality of address control lines traversing the lines of said addressing circuits, each address control line corresponding to a respective order of an address code; a respective plurality of address decoding cryotrons having the gates thereof included in said first line of each of said addressing circuits and having the controls thereof included in a unique combination of said address control lines, and means for selectively by-passing a faulty memory address.

16. The selection circuit defined by claim 15 wherein at least one of said addressing circuits includes a plurality of address decoding cryotrons, one for each order of said address code, having the gates thereof included in said first line of the addressing circuit; a persistent current loop in series with each of said address control lines, each said loop including the control of a respective one of said cryotrons; and means for storing a persistent current in selected ones of said loops.

17. In a cryogenic memory having a plurality of memory locations, the combination of: a plurality of drive lines, each traversing predetermined memory locations; means connecting said drive lines in series; means for applying a drive current to said series connected drive lines; a respective normally superconductive shunt path for said drive current connected in parallel with each of said drive lines; a respective address circuit for each of said drive lines for controlling the path of said drive current, each of said address circuits comprising first and second lines providing alternate paths for a selection current, each of said address circuits including a respective plurality of address decodying cryotrons having the gates thereof included in said first line; a plurality of address control lines traversing said address circuits, each address control line corresponding to a respective order of an address code, the controls of said address decoding cryotrons of each of said address circuits being included in a respective unique combination of said address control lines; means for applying a combination of address control currents corresponding to a selected drive line according to said address code to said address control lines whereby said selection current is directed through said first line of the address circuit corresponding to said selected drive line and through the second lines of the remaining address circuits; means responsive to said selection current in the first line of said address circuit corresponding to said selected drive line for directing said drive current through said selected drive line, and means for selectively by-passing a faulty memory location.

18. In a cryogenic memory system having a plurality of drive lines for selecting memory locations, a selection circuit for passing a drive current through a selected one of said drive lines, comprising: a plurality of drive lines each forming a loop traversing respective predetermined ones of said memory locations; means connected said drive lines in series; a plurality of J-cells, one for each of said drive lines, each of said J-cells having first and second lines; means for applying a selection current to said J-cells; a plurality of reset cryotrons, each having its gate included in said second line of each of said J-cells; a reset line including the controls of said reset cryotrons; means for applying a reset current pulse to said reset line whereby said selection current is directed through the first lines of said J-cells; a plurality of address control lines traversing said J-cells, one for each order of an address code; a respective plurality of address decoding cryotrons having the gates thereof included in said first line of each J-cell and having the controls thereof included in a unique combination of said address control lines; a plurality of J-cell output cryotrons each having its control included in said first line of a respective J-cell and having its gate connected in parallel with the corresponding drive line, said drive lines having substantially greater inductance than the gates of said output cryotrons; means for applying a combination of address control currents corresponding to a selected drive line to said address control lines whereby said selection current is diverted from said first lines of all J-cells except the one J-cell corresponding to said selected drive line, whereby said output cryotron of said one J-cell remains resistive and the remaining output cryotrons become superconductive; means for applying a drive current to said series connected drive lines whereby said drive current flows through the selected drive line and through the superconductive output cryotron gates in parallel with the remaining drive lines, and means for selectively by-passing a faulty J-cell.

19. The circuit defined by claim 18 including means for disabling any one of said J-cells and wherein at least one of said J-cells includes a plurality of persistent current storage loops, one for each order of said address code, each connected in series with a respective one of said address control lines, each of said storage loops comprising first and second branches, each of said storage loops including a first cryotron having the gate thereof in said first line of said J-cell and the control thereof in said first branch of said storage loop, and a second cryotron having the gate thereof in said second branch of said storage loop; and a store address current line including the controls of the second cryotrons of said storage loops.

20. In a cryogenic memory, the combination of: a plurality of normally superconductive drive lines for selecting memory locations; means connecting said drive lines in series; means for applying a drive current to said series connected drive lines; a respective normally superconductive shunt line connected in parallel with said drive lines for providing alternate paths for said drive current; selectively operable address decoding means for directing said drive current through a selected one of said drive lines and through the shunt lines connected in parallel with the other of said drive lines, and means for selectively by-passing a faulty drive line of said series of drive lines.

References Cited

UNITED STATES PATENTS

| | | | |
|---|---|---|---|
| 3,356,999 | 12/1967 | Gianola | 340—173.1 |
| 3,327,303 | 6/1967 | Hughes | 340—173.1 |
| 3,259,887 | 7/1966 | Garwin | 340—173.1 |
| 3,196,409 | 7/1965 | Davies | 340—173.1 |

TERRELL W. FEARS, Primary Examiner

U.S. Cl. X.R.

307—245